US006049541A

United States Patent [19]
Kerns et al.

[11] Patent Number: 6,049,541
[45] Date of Patent: Apr. 11, 2000

[54] DISTRIBUTED TELECOMMUNICATIONS SWITCHING SYSTEM AND METHOD

[75] Inventors: Daniel J. Kerns, Petaluma; Paul M. Elliott, Jenner; Dieter H. Nattkemper, Rohnert Park, all of Calif.

[73] Assignee: Alcatel USA Sourcing, L.P., Plano, Tex.

[21] Appl. No.: 08/985,387

[22] Filed: Dec. 4, 1997

[51] Int. Cl.[7] .................................................. H04L 12/40
[52] U.S. Cl. ........................... 370/365; 370/440; 370/395
[58] Field of Search .................................... 370/395, 365, 370/438, 439, 440, 420

[56] References Cited

U.S. PATENT DOCUMENTS

| 5,001,707 | 3/1991 | Kositpaiboon et al. | 370/440 |
|---|---|---|---|
| 5,038,346 | 8/1991 | Courtois | 370/440 |
| 5,081,622 | 1/1992 | Nassehi et al. | 370/440 |
| 5,124,981 | 6/1992 | Golding | 370/440 |
| 5,157,657 | 10/1992 | Potter et al. | 370/440 |
| 5,193,090 | 3/1993 | Filipiak et al. | 370/440 |
| 5,452,330 | 9/1995 | Goldstein | 370/438 |

Primary Examiner—Chau Nguyen
Assistant Examiner—Phuongchau Ba Nguyen
Attorney, Agent, or Firm—Fliesler, Dubb, Meyer & Lovejoy

[57] ABSTRACT

A distributed telecommunications switching system (100) is disclosed. The system includes a controller (140) that generates and transmits a cell stream with a plurality of reserved cells. A first switching subsystem (104) in communication with the controller (140) receives the cell stream and a first plurality of cells. The first switching subsystem (104) identifies the reserved cells in the cell stream and replaces selected ones of the reserved cells with selected ones of the first plurality of cells to produce a modified cell stream. The modified cell stream is transmitted to a second switching subsystem (102).

14 Claims, 4 Drawing Sheets

DISTRIBUTED TELECOMMUNICATIONS SWITCHING SYSTEM AND METHOD

TECHNICAL FIELD OF THE INVENTION

This invention relates generally to the field of telecommunications switching, and more particularly to a distributed telecommunications switching system and method.

BACKGROUND OF THE INVENTION

A variety of telecommunications switching systems have been used to establish communication between customer premises equipment (CPE) units and a central office. Most such systems are formed in a "tree" structure, in which the central office is connected to several switching units, which are each connected to several smaller switching units, and so on. At the lowest level of switching units, each unit is connected to one or more CPE units.

To route addressed data or otherwise communicate with one of the CPE units, the central office determines which "branch" services the CPE unit in question. The data is then passed to the switching system for that branch, which in turn passes the data on to the next lower level in the switching hierarchy, and so on, until the data reaches the CPE unit.

This routing scheme requires that each switching system at each level in the hierarchy must store address and routing information for all of the CPE units serviced by it. If the customer base is expanded to include additional CPE units, then all switching systems routing traffic to the new CPE units must be reprogrammed to store the new address and routing information.

SUMMARY OF THE INVENTION

Therefore, a need has arisen for a telecommunications switching system that addresses the disadvantages and deficiencies of the prior art.

A distributed telecommunications switching system is disclosed. The system includes a controller that generates and transmits a cell stream with a plurality of reserved cells. A first switching subsystem in communication with the controller receives the cell stream and a first plurality of cells. The first switching subsystem identifies the reserved cells in the cell stream and replaces selected ones of the reserved cells with selected ones of the first plurality of cells to produce a modified cell stream. The modified cell stream is transmitted to a second switching subsystem.

A technical advantage of the present invention is that subscribers to over-subscribed data traffic classes receive service mediated by an upstream flow control process. A further advantage is that upstream bandwidth is distributed to subscribers in fair manner according to a class of service selected by each subscriber.

BRIEF DESCRIPTION OF THE DRAWINGS

Embodiments of the invention will now be described, by way of example only, with reference to the accompanying drawings in which like reference signs are used for like features and in which.

DETAILED DESCRIPTION OF THE INVENTION

I. Distributed Switch Architecture

Figure 1:
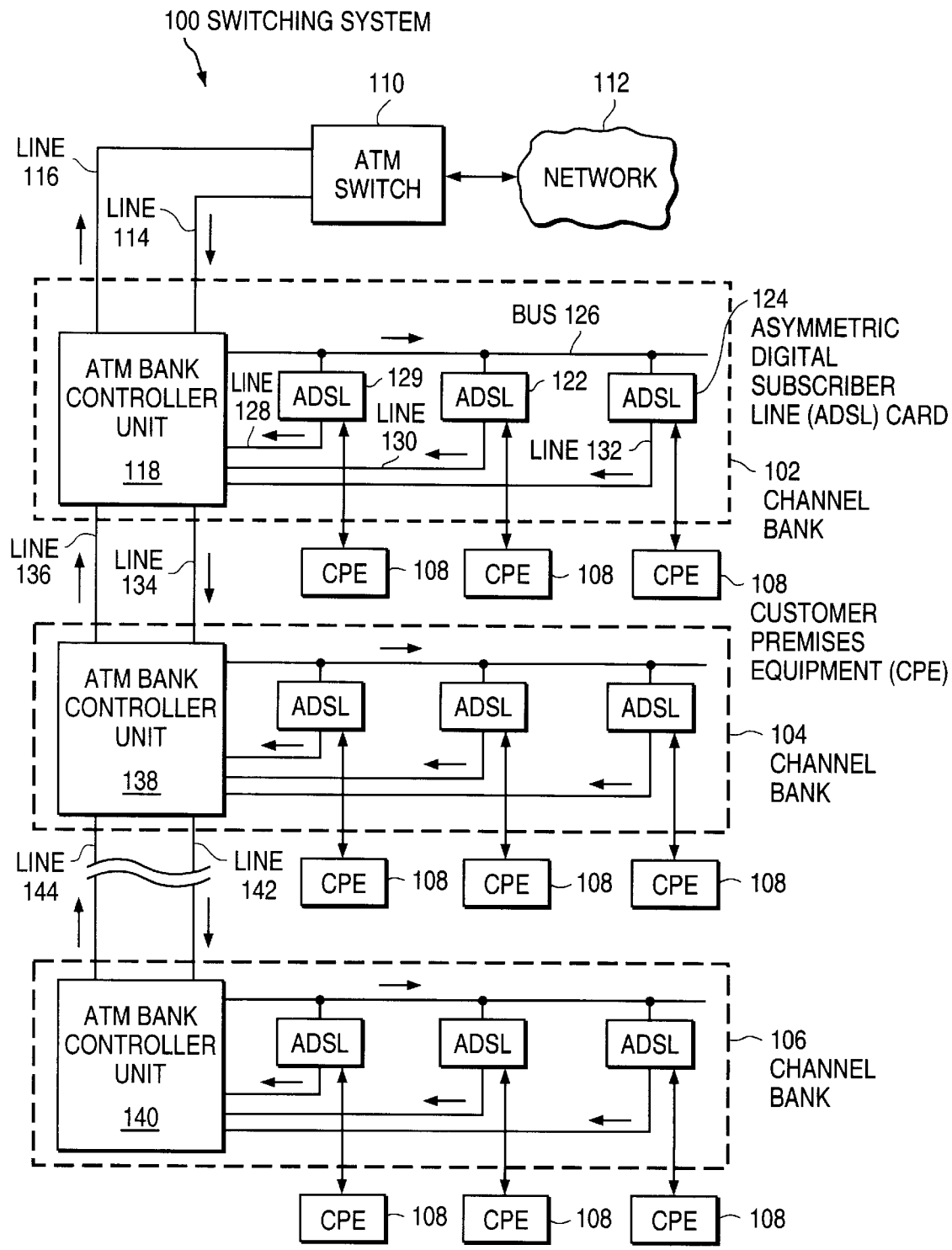
FIG. 1 is a block diagram of a distributed switching system.

Referring to FIG. 1, a distributed telecommunications switching system 100 is shown. Switching system 100 comprises a plurality of switching subsystems 102, 104 and 106, referred to as channel banks. Each channel bank provides data and/or voice communication services to a plurality of customer premises equipment (CPE) units 108. A primary channel bank 102 communicates with an asynchronous transfer mode (ATM) switch 110, which in turn communicates with a telecommunications network 112. ATM switch 110 may, for example, be located at a telephone company central office.

In the preferred embodiment described herein, the primary function of switching system 100 is to route data packets in the well known ATM cell format from ATM switch 110 to individual CPE units 108, and to carry ATM cells from CPE units 108 to ATM switch 110. Together, ATM switch 110 and switching system 100 provide communication paths between CPE units 108 and one or more destinations in telecommunications network 112. It will be understood that the distributed switching system and method described herein may also be employed to route digital or analog information encoded in other formats, such as TCP/IP data packets.

In the following discussion, ATM cells being sent from ATM switch 110 to CPE units 108, or any other destination in switching system 100, will be referred to as traveling in the downstream direction. Any cells sent from switching system 100 to ATM switch 110 will be referred to as traveling in the upstream direction.

Primary channel bank 102 communicates with ATM switch 110 by means of communication line 114, which carries ATM cells downstream from ATM switch 110 to primary channel bank 102, and by means of communication line 116, which carries cells upstream from primary channel bank 102 to ATM switch 110. In the preferred embodiment, communication lines 114 and 116 are fiber optic cables capable of carrying data at the standard OC-3 data rate.

Primary channel bank 102 comprises a controller 118 referred to as an ATM bank controller unit (ABCU) and a plurality of subscriber interface cards 120, 122 and 124, referred to as asymmetric digital subscriber line (ADSL) cards. Controller 118 transmits cells downstream to subscriber interface cards 120, 122 and 124 on a shared high speed cell bus 126. Subscriber interface cards 120, 122 and 124 transmit cells upstream to controller 118 via serial bus interface (SBI) lines 128, 130 and 132, respectively.

Controller 118 sends cells downstream to channel bank 104 via communication line 134, and receives cells traveling upstream via communication line 136. Communication lines 134 and 136, like lines 114 and 116, are preferably fiber optic cables capable of carrying data at the standard OC-3 data rate.

Downstream channel banks 104 and 106 are similar in structure to primary channel bank 102, each having a controller 138 and 140, respectively, and a plurality of subscriber interface cards. Some differences in functionality among the channel banks will become apparent from the description to follow.

Figure 4:
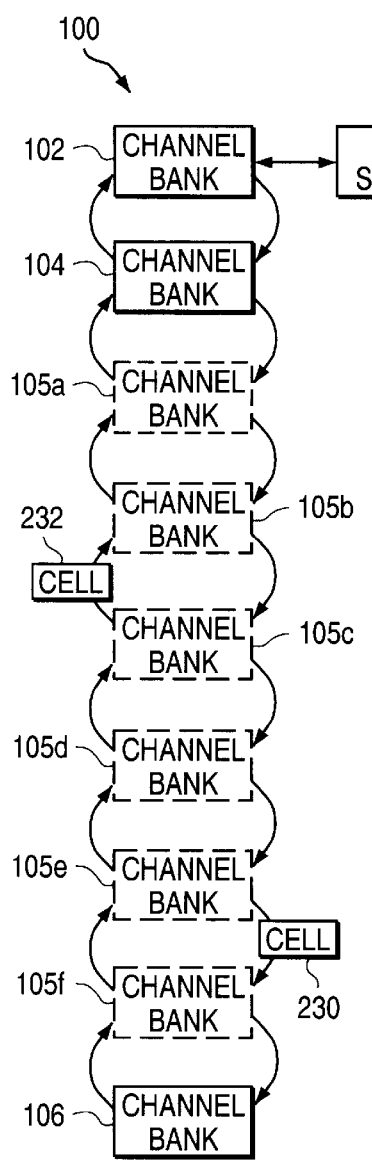
FIG. 4 is a block diagram illustrating a first upstream flow control system for the distributed switching system.

Channel bank 104 may be directly coupled to channel bank 106 by communication lines 142 and 144. Alternatively, one or more channel banks may be situated between channel banks 104 and 106 in a "daisy chain" arrangement, with each channel bank being connected to the previous one by communication lines, as shown. Switching system 100 preferably comprises up to nine channel banks, as shown in FIG. 4. Regardless of the number of channel banks in switching system 100, channel bank 106 is the last channel bank in the chain.

Each channel bank 102, 104, 106 may include up to 60 subscriber interface cards, with each subscriber interface card communicating with up to four separate customers. The communication with CPE units 108 is asymmetric, with a data rate of up to six million bits per second (6 Mbps) supplied to the customer and up to 640 Kbps received from the customer. The type of service provided to the customer may be plain old telephone service (POTS), data service, or any other telecommunications service, and may or may not include a minimum cell rate (MCR) guaranteed for the customer's upstream data communications.

Generally, switching system 100 will be oversubscribed in the upstream direction, meaning that the cumulative peak cell rate (PCR) which may be transmitted by the customers exceeds the maximum rate at which switching system 100 may transmit cells to ATM switch 110. Control methods that allow switching system 100 to provide adequate service to oversubscribed customers will be discussed more fully below.

Figure 2:
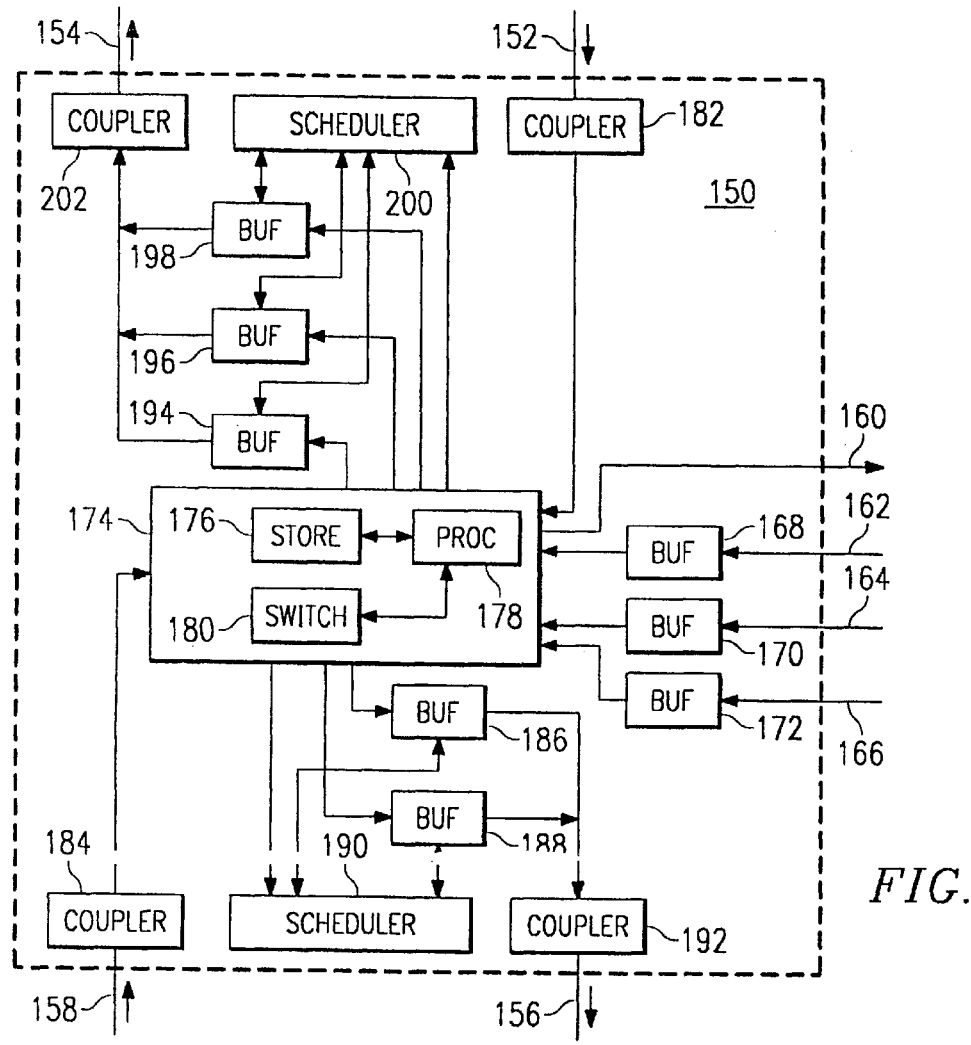
FIG. 2 is a block diagram of a controller for use in the distributed switching system.

Referring to FIG. 2, a functional block diagram of an upstream ABCU or controller 150 in accordance with the invention is shown. Controller 150 may be implemented in switching system 100 as controller 118 or 138, or as a controller for another intermediate channel bank situated between channel bank 104 and 106.

Controller 150 receives cells traveling downstream from ATM switch 110 or another controller via fiber optic cable 152, and send cells upstream via fiber optic cable 154. Controller 150 sends cells downstream to another channel bank via fiber optic cable 156, and receives cells from downstream channel banks via fiber optic cable 158.

Controller 150 transmits cells to subscriber interface cards such as cards 120, 122 and 124 on a shared high speed cell bus 160. When a large number of subscriber interface cards are serviced by controller 150, high speed cell bus 160 may comprise a plurality of separate lines, each carrying the same high speed signal to a separate set of subscriber interface cards. For example, in a configuration with 60 subscriber interface cards being serviced by controller 150, high speed cell bus 160 may comprise three separate lines, each connected to 20 subscriber interface cards, but each carrying cells addressed to all of the subscriber interface cards.

Each subscriber interface card sends cells upstream to controller 150 via a separate subscriber bus interface line 162, 164 or 166. In addition to carrying ATM traffic, subscriber bus interface lines 162, 164 and 166 may also carry telephone traffic from POTS subscribers. In that case, the POTS traffic may be separated out from the ATM traffic and processed by equipment which is outside the scope of this application. This separation occurs before the processing of ATM cells described herein. The downstream communication of POTS traffic to subscriber interface cards 120, 122 and 124 may occur on lines other than high speed cell bus 160. Such communication is outside the scope this application.

Buffers 168, 170 and 172 receive ATM signals on subscriber bus interface lines 162, 164 and 166, respectively, and store the received data until one or more complete cells are received. The cells are then passed on to an internal switching system 174, which comprises an address storage system 176, a processor 178, and a switch 180.

Address storage system 176 stores a list of addresses corresponding to the CPE units 108 serviced by controller 150. In the preferred embodiment, each address identifies a virtual path and virtual circuit for a CPE unit 108, in an addressing format well known to those skilled in the art of ATM communications. However, it will be appreciated that other addressing systems, such as IP addressing, may be used to identify cell destinations both within and outside switching system 100.

Incoming signals on fiber optic cables 152 and 158 are converted to electrical signals by fiber optic couplers 182 and 184, respectively. The converted signals are transmitted to internal switching system 174.

Internal switching system 174 transmits cells to a downstream channel bank via fiber optic cable 156. To accomplish this, cells are transmitted to a plurality of first in first out (FIFO) buffers or queues 186 and 188 controlled by a scheduler 190. When triggered by scheduler 190, each queue 186 or 188 dequeues one or more cells, transmitting the cells to a fiber optic coupler 192, which converts the data signals to optical signals for transmission over fiber optic cable 156.

Likewise, internal switching system 174 transmits cells to an upstream channel bank or ATM switch 110 via fiber optic cable 154. To accomplish this, cells are transmitted to a plurality of FIFO queues 194, 196 and 198 controlled by a scheduler 200. When triggered by scheduler 200, each queue 194, 196 or 198 dequeues one or more cells, transmitting the cells to a fiber optic coupler 202, which converts the data signals to optical signals for transmission over fiber optic cable 154.

In operation, controller 150 receives ATM cells from upstream on fiber optic cable 152. Processor 178 compares the address portion of a received cell to the list of addresses stored in address storage system 176. If a match is found, then switch 180 transmits the cell to the subscriber interface cards associated with controller 150 on shared high speed cell bus 160.

All of the subscriber interface cards associated with controller 150 check the address of the transmitted cell and compare it to their internal address lists. Only the subscriber interface card servicing the CPE unit to which the cell is addressed reacts to receipt of the cell. All other subscriber interface cards ignore the cell.

Returning to controller 150, if the address of the cell did not match any of the addresses stored in address storage system 176, then processor 178 compares the address of the cell to a processor address to determine whether the cell is a control cell addressed to processor 178. If the address matches the processor address, then the control cell is processed by processor 178 in a manner to be described below.

If the cell address does not match the processor address, then the cell is sent by switch 180 to a bypass queue 186. When bypass queue 186 receives a cell, it sends a ready signal to scheduler 190, which coordinates transmissions over fiber optic cable 156. When scheduler 190 sends a transmit signal to bypass queue 186, the cell is transmitted to coupler 192 and on to fiber optic cable 156.

Processor 178 may also generate control cells for transmission to downstream channel banks, as will be described more fully below. When processor 178 generates such a cell, the cell is passed by switch 180 to CPU queue 188, which transmits a ready signal to scheduler 190. Scheduler 190 preferably controls both bypass queue 186 and CPU queue 188 to ensure that CPU queue 188 receives higher priority than bypass queue 186. This priority scheme may be implemented in a variety of ways. For example, bypass queue 186 may be allowed to dequeue a cell only when CPU queue 188 is empty. Because the frequency of control cells is low, this priority scheme does not significantly impede downstream traffic.

It will be appreciated by those skilled in the art that the downstream cell switching process executed by controller 150 differs from that of a telecommunications switching system arranged in a tree structure. Rather than storing addresses for all customers located downstream of controller 150, address storage system 176 only stores addresses corresponding to the customers directly serviced by controller 150. Any cell having an unrecognized address is passed downstream to another controller for processing. This allows for a smaller address storage system 176 and faster address processing in controller 150.

In the upstream direction, controller 150 receives ATM cells from downstream channel banks on fiber optic cable 158. Processor 178 compares the address portion of a received cell to its own address to determine whether the cell is a control cell addressed to processor 178. If the address matches the processor address, then the control cell is processed by processor 178 in a manner to be described below.

If the cell address does not match the processor address, then the cell is sent by switch 180 to a bypass queue 194. When bypass queue 194 receives a cell, it sends a ready signal to scheduler 200, which coordinates transmissions over fiber optic cable 154. When scheduler 200 sends a transmit signal to bypass queue 194, the cell is transmitted to coupler 202 and on to fiber optic cable 154.

If controller 150 is implemented in a downstream channel bank, i.e. a channel bank other than primary channel bank 102, then processor 178 may also generate control cells for transmission to upstream channel banks, as will be described more fully below. When processor 178 generates such a cell, the cell is passed by switch 180 to a CPU queue 196, which transmits a ready signal to scheduler 200. When scheduler 200 sends a transmit signal to CPU queue 196, the control cell is transmitted to coupler 202 and on to fiber optic cable 154.

Cells are received from the local CPE units 108 serviced by controller 150 on subscriber bus interface lines 162, 164 and 166. As previously noted, controller 150 may receive cells from up to 60 subscriber bus interface lines. Processor 178 checks the address portion of each cell to determine whether the cell is addressed to processor 178 itself, or to a valid upstream destination.

The subscriber interface cards controlled by controller 150 may, for example, send status feedback cells to processor 178 indicating whether traffic congestion is occurring in the subscriber interface cards. Processor 178 processes these status feedback cells.

Other cells addressed to valid upstream destinations are transmitted by switch 180 to ingress queue 198. Scheduler 200 controls bypass queue 194, CPU queue 196 and ingress queue 198 to implement a selected priority scheme. In the preferred embodiment, CPU queue 196 receives the highest priority, bypass queue 194 receives the next priority, and ingress queue 198 receives the lowest priority. As with scheduler 190, this priority scheme may be implemented in a variety of ways. For example, ingress queue 198 may be allowed to dequeue a cell only when CPU queue 196 and bypass queue 104 are both empty. Because the frequency of control cells is low, this priority scheme does not significantly impede upstream traffic.

Figure 2A:
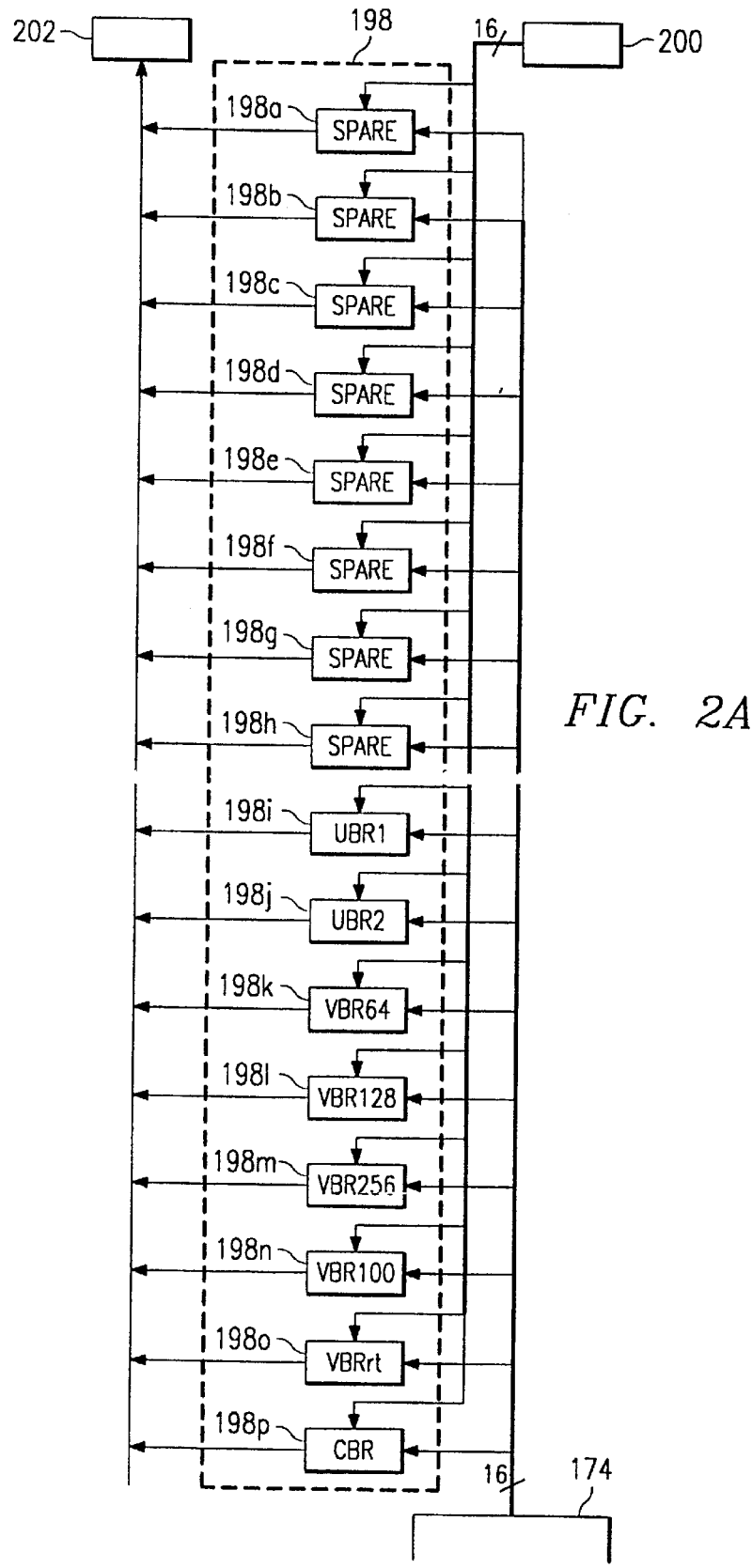
FIG. 2A is an expanded block diagram of an ingress queue system for use in the distributed switching system.

In an alternative embodiment of controller 150, ingress queue 198 actually comprises 16 separate ingress queues, as shown in FIG. 2A. Each ingress queue 198a–198p is assigned a separate priority. As in the previous embodiment, a priority scheme is enforced by scheduler 200.

The priority scheme allows each queue to provide different classes of service to customers. For example, each ingress queue may receive cells belonging to one of the well-known ATM cell traffic classes, as illustrated in FIG. 2A. In this example, ingress queues 198a through 198h are spare queues, ingress queue 198i receives unspecified bit rate (UBR) traffic with fair performance, ingress queue 198j receives UBR traffic with good performance, ingress queues 198k, 198l and 198m receive variable bit rate (VBR) traffic with guaranteed minimum cell rates of 64 Kbps, 128 Kbps and 256 Kbps, respectively, ingress queue 198n receives VBR traffic with guaranteed 100% cell throughput, ingress queue 198o receives real-time variable bit rate (VBR) traffic, and ingress queue 198p receives constant bit rate (CBR) traffic.

In this embodiment, internal switching system 174 assigns cells to different ingress queues according to the origin of each cell. Customers serviced by switching system 100 select in advance a class of service they would like to receive, with higher priority traffic classes and guaranteed minimum throughputs being more expensive than low priority and/or oversubscribed service. Each customer's cells are then sent by internal switching system 174 to the appropriate ingress queue 198a through 198p.

Scheduler 200 and processor 178 are programmed to dequeue upstream queues 194, 196 and 198 according to a predetermined priority scheme. The optimal priority scheme to implement depends on a number of situation-specific factors, such as the number of ingress queues, the classes of service offered, the oversubscription ratio, and predicted traffic load statistics. However, certain guidelines must be followed. For example, ingress queue 198k must be allowed to dequeue cells often enough to achieve the minimum throughput of 64 Kbps.

The priority scheme implemented by scheduler 200 and processor 178 may vary with the level of traffic congestion in controller 150. For example, any ingress queues 198a through 198p that are not empty may be dequeued in a round robin fashion unless the traffic congestion in controller 150 reaches a threshold level, at which point the minimum cell rate guarantees for some ingress queues require a preferential dequeuing process to be implemented.

It will be appreciated that the various elements of controller 150, excluding fiber optic couplers 152 through 158, generally perform data storage and signal processing functions, and may therefore be implemented as hardware, firmware, software, or some combination thereof.

Figure 3:
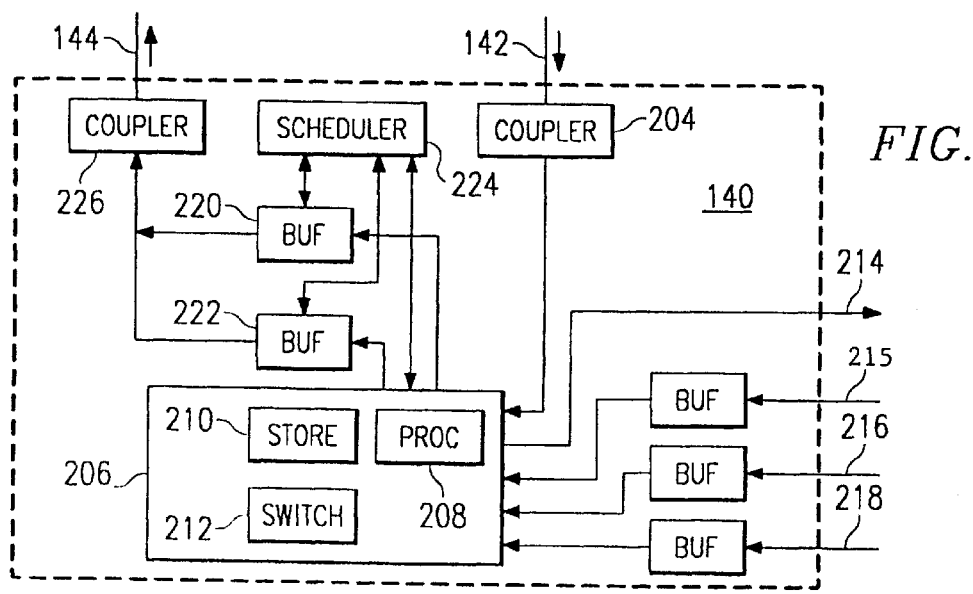
FIG. 3 is a block diagram of a terminating controller for use in the distributed switching system.

Referring to FIG. 3, a functional block diagram of controller 140 is shown. Controller 140 is similar in structure to controller 150 described above in connection with FIG. 2. However, because controller 140 controls the last channel bank 106 in switching system 100, controller 140 does not receive or transmit cells to any downstream channel banks. For the purposes of this description only, it will be assumed that switching system 100 comprises only three channel banks, and that controller 140 therefore communicates directly with controller 138.

Signals traveling downstream on fiber optic cable 142 are converted to electrical signals by fiber optic coupler 204. The converted signals are transmitted to internal switching system 206.

Internal switching system 206 transmits cells to a controller 138 via fiber optic cable 144. To accomplish this, cells are transmitted to a plurality of FIFO queues 220 and 222 controlled by a scheduler 224. When triggered by scheduler 224, each queue 220 or 222 dequeues one or more cells, transmitting the cells to a fiber optic coupler 226, which converts the data signals to optical signals for transmission over fiber optic cable 144.

In operation, controller 140 receives ATM cells from upstream on fiber optic cable 142. A processor 208 of an internal switching system 206 compares the address portion of a received cell to the list of addresses stored in address storage system 210. If a match is found, then switch 212 transmits the cells to the subscriber interface cards associated with controller 140 on shared high speed cell bus 214.

If the address of the cell does not match any of the addresses stored in address storage system 210, then processor 208 compares the address of the cell to its own address to determine whether the cell is a control cell addressed to processor 208. If the address matches the processor address, then the control cell is processed by processor 208 in a manner to be described below.

If the cell address does not match the processor address, then the cell has failed to match any of the addresses serviced by switching system 100. At this point, the cell is deemed a mis-inserted cell, and is processed by processor 208, which may gather statistics on such cells. Mis-inserted cells may, for example, indicate that an unauthorized party is attempting to receive service from switching system 100.

In the upstream direction, cells are received from the local CPE units 108 serviced by controller 140 on subscriber bus interface lines 215, 216 and 218. As previously noted, controller 140 may receive cells from up to 60 subscriber bus interface lines. Processor 208 checks the address portion of each cell to determine whether the cell is addressed to processor 208 itself, or to a valid upstream destination.

Cells addressed to valid upstream destinations are transmitted by switch 212 to ingress queue 220. Processor 208 may also generate control cells for transmission to upstream channel banks, as will be described more fully below. When processor 208 generates such a cell, the cell is passed by switch 212 to a CPU queue 222.

A scheduler 224 controls CPU queue 222 and ingress queue 220 to implement the selected priority scheme, as previously described. In the preferred embodiment, CPU queue 222 receives higher priority than ingress queue 220. Because the frequency of control cells is low, this priority scheme does not significantly impede upstream traffic.

From the foregoing description, it will be appreciated that switching system 100 provides distributed telecommunications switching which features several advantages over a traditional tree structure. Each channel bank only stores a limited number of addresses pertaining to customers directly serviced by the channel bank, and is effectively independent of the other channel banks in the system.

In addition to simplifying the setup for switching system 100, the modularity of the system allows expansion of service with minimal modification to the existing structure. When a set of new customers is to be serviced, a new channel bank may be added into switching system 100. The new channel bank may be programmed with the addresses of the new customers, while the cell processing methods and address storage for other channel banks remain unaffected.

The channel banks in switching system 100 may also be located remotely from one another without significant degradation in service. This allows customers in different locations to be "close to the switch," decreasing access times for the customers and improving service.

II. First Upstream Flow Control System

Because switching system 100 is oversubscribed in the upstream direction, some control system must be implemented to ensure uniformity in quality of service for customers throughout switching system 100. For example, if upstream bypass queue 194 in controller 118 receives higher priority than ingress queue 198, then CPE units 108 serviced by channel bank 102 may be effectively blocked from access to ATM switch 110 due to heavy upstream traffic. An upstream flow control system must be implemented to ensure fairness throughout switching system 100.

Two different upstream flow control systems will be described herein. Although these control systems are presented as mutually exclusive alternatives, it will be appreciated that variations and combinations of these two control schemes may be implemented without departing from the spirit and scope of the invention.

Referring to FIG. 4, the operation of the first upstream flow control system is illustrated. In this control system, controller 118 in channel bank 102 periodically initiates a control loop by generating a control cell 230. In general terms, the control cell performs two functions: providing control information to each channel bank in switching system 100, and triggering a status feedback cell 232 that provides information to controller 118 concerning the cell traffic congestion at each channel bank. The control cell is preferably generated only when controller 118 is not experiencing high traffic congestion levels in the upstream direction, so that the returning status feedback cell 232 will not contribute to upstream traffic congestion.

An exemplary format for control cell 230 is shown in Table A. This cell follows a standard ATM Organization, Administration and Maintenance (OAM) cell format. Thus, octets 1 through 5 include standard ATM header information and octet 6 includes OAM and function type information, which identifies the cell as a control cell.

Octets 7 and 8 contain a control command word which sets the length or interval of a control cycle, expressed as a number of cells. Thus, if the control command word has a value of 128, then a control cycle will be deemed to constitute an interval of 128 cells in the upstream flow. Every 128 cells then constitutes a separate control cycle.

TABLE A

| Octet | Function |
|---|---|
| 1–5 | standard ATM header |
| 6 | 4 bits OAM type |
|  | 4 bits Function type |
| 7–8 | Control command word - contains length of control cycle in cell times |
| 9–24 | 8 words of 16 bits contain the credit allowance for each of the 8 daisy chained channel banks octets 9 and 10 are for the first channel bank octets 23 and 24 are for the last channel bank |
| 25–46 | spare |
| 47–48 | 6 bits reserved 10 bits for CRC-10 |

Octets 9 through 24 contain up to eight credit allowance words of 16 bits each. One credit allowance word is included for each downstream channel bank in switching system 100. Thus, for example, if channel banks 102, 104 and 106 were the only channel banks in switching system 100, then octets 9 through 12 would contain one credit allowance word each for channel banks 104 and 106, while octets 13 through 24 will remain empty.

The credit allowance word for a channel bank indicates the number of cells in a control cycle that are allotted to that channel bank for transmission upstream. For example, if the control cycle length is 128 cells, and the credit allowance word for channel bank 104 has a value of 43, then controller 138 may transmit 43 cells upstream on fiber optic cable 136 during the next 128-cell interval.

This credit-based upstream flow control is implemented by processor 178 shown in FIG. 2. Thus, processor 178 maintains a counter (not explicitly shown) which is decremented by one every time processor 178 sends a cell to ingress queue 198. When the counter reaches zero, no more cells are sent to ingress queue 198 until the next control cycle.

Returning to Table A, Octets 25 through 46 of the control cell are unused. Octets 47 and 48 include 10 bits used for a cyclical redundancy check (CRC) of the control cell, while the other six bits remain unused.

When a control cell is generated by controller 118, the control cell is passed to CPU queue 188 for transmission downstream to controller 138. Controller 138 receives the control cell and reads octets 7 through 10 to determine the length of the control cycle and the credit allowance for channel bank 104. Controller 138 then passes the control cell downstream, unmodified.

Likewise, each controller downstream receives the control cell, reads its own credit allowance, and passes the control cell further downstream, as illustrated in FIG. 4. Controller 140 in channel bank 106 discards the control cell after reading it.

Controller 140 is programmed to respond to the receipt of a control cell by generating a status feedback cell 232. This cell is passed upstream, with cell traffic congestion information being written into the status feedback cell by each controller in switching system 100. When the cell reaches controller 118 in channel bank 102, the status feedback information is read and the cell is discarded.

An exemplary format for status feedback cell 232 is shown in Table B. Like control cell 230 described above, the status feedback cell follows the standard OAM format. Thus, octets 1 through 5 include standard ATM header information and octet 6 includes OAM and function type information, which identifies the cell as a status feedback cell.

TABLE B

| Octet | Function |
|---|---|
| 1–5 | standard ATM header |
| 6 | 4 bits OAM type<br>4 bits Function type |
| 7–22 | 8 words of 16 bits contain the status for each of the 8 daisy chained channel banks octets 7 and 8 are for the first channel bank<br>octets 21 and 22 are for the last channel bank |
| 23–44 | spare |
| 45–46 | Number of cells in upstream bypass queue of last Release Two shelf |
| 47–48 | 6 bits reserved<br>10 bits for CRC-10 |

Octets 7 through 22 contain up to eight status feedback words of 16 bits each. One status feedback word appears for each downstream channel bank in switching system 100. Thus, for example, if channel banks 102, 104 and 106 are the only channel banks in switching system 100, then octets 7 through 10 will contain one credit allowance word each for channel banks 104 and 106, while octets 11 through 22 will remain empty.

The status feedback word for each channel bank identifies the current traffic congestion level at the channel bank. It will be appreciated that various formats may be used to identify traffic congestion levels. In the preferred embodiment, one of four traffic congestion levels is ascribed to ingress queue 198.

In the embodiment shown in FIG. 2A, in which ingress queue 198 comprises 16 separate ingress queues, each with its own priority level, a separate traffic congestion level is ascribed to each priority level group of ingress queues. The status feedback word format for this embodiment is illustrated in Table C.

TABLE C

| Bit | Function |
|---|---|
| 0–9 | free list |
| 10–11 | congestion state for lowest priority group of queues<br>0 = level 0<br>1 = level 1<br>2 = level 2<br>3 = level 3 |
| 12–13 | congestion state for second to lowest priority group of queues<br>0 = level 0<br>1 = level 1<br>2 = level 2<br>3 = level 3 |
| 14–15 | congestion state for third to lowest priority group of queues<br>0 = level 0<br>1 = level 1<br>2 = level 2<br>3 = level 3 |

Generally, the traffic congestion level for a queue is determined by reference to the buffer space allotted for the queue. The higher the amount of allotted buffer space being utilized by the queue, the higher the traffic congestion level for the queue.

The threshold congestion levels which quantitatively define the four traffic congestion levels must vary from queue to queue according to variables such as queue size, free buffer space, anticipated queue traffic patterns, and in some cases the rate of decrease of free buffer space. However, in general terms, Level 0 represents a normal or uncongested state, Level 1 represents a near congestion state, Level 2 represents a congestion imminent state, and Level 3 represents a congested state.

These congestion levels may be used not only to provide feedback to controller 118, but also to regulate cell processing within a controller 150. For example, at Level 0, cell handling may proceed normally. At Level 1, processor 178 may begin implementing congestion control measures such as early packet discard (EPD), partial packet discard (PPD) and/or restricting the cell flow rate to ingress queues 198a through 198p on a queue-by-queue basis. At Levels 2 and 3, these congestion control measures may be implemented in a progressively severe manner.

Referring to Table C, bits 0 through 9 of the status feedback word give the total free buffer space available for the ingress queues. Bits 10 and 11 give the traffic congestion level for the lowest priority group of queues, which may be, for example, queues 198*i* and 198*j*. Bits 12 and 13 give the traffic congestion level for the second lowest priority group of queues, which may be, for example, queues 198*k* through 198*n*. Bits 14 and 15 give the traffic congestion level for the third lowest priority group of queues, which may be, for example, queues 198*o* and 198*p*.

Controller 140, and more particularly processor 208 therein, originally generates status feedback cell 232, with octets 7 and 8 containing the status feedback word for channel bank 106. The status feedback cell is then passed upstream from controller to controller, as illustrated in FIG. 4, with each controller writing its own status feedback word into the appropriate two octets of the status feedback cell. When controller 118 in channel bank 102 receives status feedback cell 232, the cell is routed to processor 178, which utilizes the traffic congestion information contained in status feedback cell 232, as well as traffic congestion information from controller 118 itself, to determine an appropriate credit distribution to be included in the next control cell 230.

This process is repeated periodically during the operation of switching system 100. Each control cell 230 generated by processor 178 includes a credit distribution for the downstream channel banks based upon information from the previous status feedback cell 232. Processor 178 also assigns credits for controller 118, but this information remains internal to controller 118 and is not included in control cell 230.

In this control system, controller 140 in channel bank 106 launches cells upstream at will from CPU queue 222, and utilizes its assigned credits to launch cells from ingress queue 220. During intervals when CPU queue 222 and ingress queue 220 are either empty or not allowed to launch cells upstream, controller 140 launches a steady stream of empty or unassigned cells. Each upstream controller receives the stream of empty cells and replaces empty cells with cells from its own queues in accordance with its priority scheme and credit allowance.

In the case where the number of empty cells transmitted upstream to controller 118 in channel bank 102 exceeds the number of credits assigned to channel bank 102, controller 118 may be programmed to dequeue cells from its ingress queues in excess of its credit allowance. This flexibility ensures maximum utilization of upstream bandwidth resources.

III. Second Upstream Flow Control System

Figure 5:
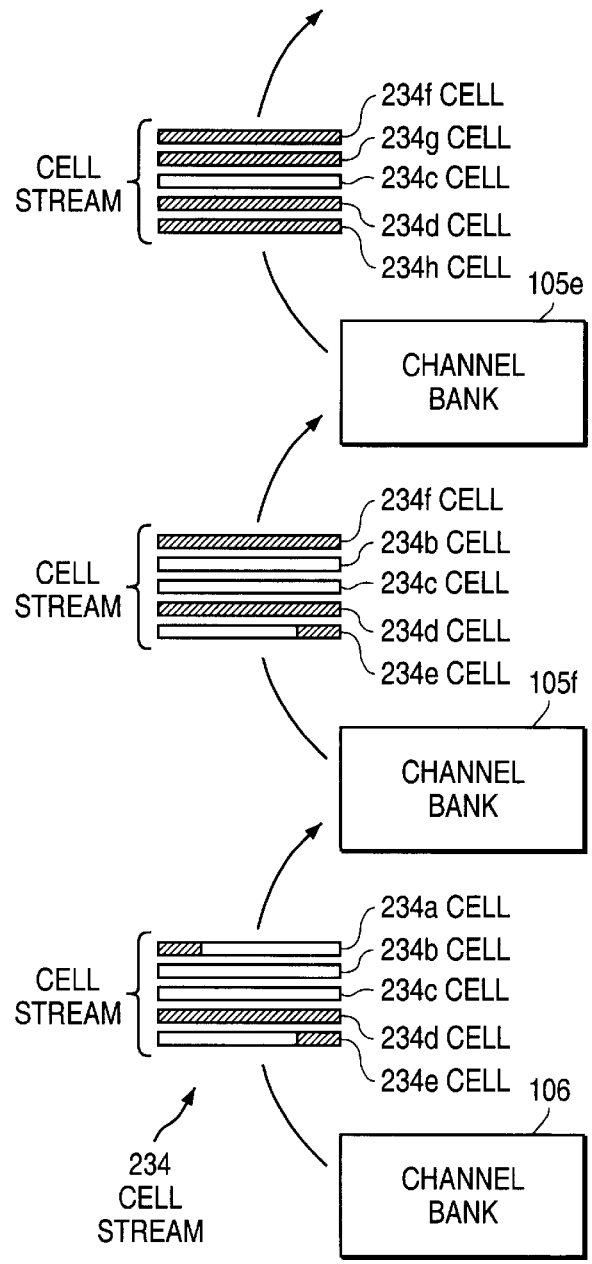
FIG. 5 is a block diagram illustrating a second upstream flow control system for the distributed switching system.

Referring to FIG. 5, the operation of the second upstream control system is illustrated. In this system, bandwidth on the upstream fiber optic cables is pre-assigned according to class of service or queue priority. This differs from the first embodiment, in which bandwidth is assigned for each channel bank, with a local scheduler in each controller making dequeuing decisions to allocate bandwidth for queues with different priorities. In the second embodiment, queues having the same priority, regardless of the channel bank in which they are located, may compete for the bandwidth assigned to that queue class.

In this control system, controller 140 in channel bank 106 generates a continuous stream of cells 234, some or all of which are marked as reserved for particular queue classes. This marking occurs in the cell header, in the location that usually contains address information. More specifically, the virtual path indicator is replaced with a unique code identifying the cell as reserved. The virtual circuit indicator is replaced with an identification of the queue class for which the cell is reserved.

A queue class may be a simple priority or traffic class designation. For example, a CPU queue such as queue 188 in each controller in switching system 100 may be designated as Queue Class One. Thus, a Queue Class One reserved cell sent upstream from controller 140 will be used by the first controller that has a non-empty CPU queue 188.

Queue classes may also provide further subdivision of queues. For example, if switching system 100 comprises nine channel banks, Queue Class One may be used to designate CPU queues in the lower three channel banks, Queue Class Two may be used to designate CPU queues in the middle three channel banks, and Queue Class Three may be used to designate CPU queues in the upper three channel banks. Likewise, a queue class may be used to designate a selected queue or set of queues in one particular channel bank.

Queue classes may also designate groups of queues servicing different traffic classes. For example, one queue class may be used to designated all queues carrying "concentrated" or oversubscribed cell traffic, such as ABR and UBR queues, while another queue class may be used to designate all queues carrying non-concentrated traffic, such as VBR and CBR queues.

In each controller, internal switching system 174 is programmed with the queue class designations of each upstream queue 194, 196 and 198. Thus, when a reserved cell for a queue class is received on fiber optic cable 158, processor 178 cooperates with scheduler 200 to ensure that, if a non-empty queue belonging to that queue class exists in controller 150, then a cell is dequeued from the non-empty queue. Otherwise, the reserved cell is passed upstream without modification.

If the reserved cell reaches controller 118, it must be replaced with a queued cell or an unassigned cell. This is because the non-standard format used to designate reserved cells will not be recognized by ATM switch 110. Reserved cells must therefore be removed from the stream before reaching ATM switch 110.

In an exemplary priority scheme, illustrated in FIG. 5, controller 140 generates a repeating sequence 234 of 1000 cells. In this sequence, 50 of the cells, represented by cell 234*a*, are reserved for concentrated traffic, while 100 cells, represented by cell 234*e*, are reserved for non-concentrated (CBR and VBR) traffic. The remaining cells are generally unassigned, i.e. empty and not reserved, as illustrated by cells 234*b* and 234*c*.

Channel bank 106 not only creates the reserved cell distribution, but also takes part in the cell reservation system as a "consumer" of upstream bandwidth. Thus, controller 140 dequeues cells from its queues 220 and 222 in place of some of the unassigned cells and/or reserved cells before launching the cells upstream, as illustrated by cell 234*d* in FIG. 5.

In this priority scheme, when an unassigned cell is received at a controller 150, processor 178 and scheduler 200 implement an internal priority scheme that gives non-concentrated traffic queues priority over concentrated traffic queues. However, five percent of the cells received are marked as reserved for concentrated traffic, ensuring that concentrated traffic queues are allowed to dequeue a minimum number of cells even when non-concentrated traffic is heavy.

Thus, referring to FIG. 5, channel bank 105*f* receives the cell stream 234 and dequeues a cell 234*f* from a concentrated traffic queue to take the place of reserved cell 234*a*. Channel bank 105*e* dequeues two cells 234*g* and 234*h* from non-concentrated traffic queues to replace unassigned cell 234b and reserved cell 234e, respectively. For channel banks upstream of channel bank 105e, only one unassigned cell 234c remains to be replaced by a dequeued traffic cell.

To ensure that the supply of reserved cells is not completely exhausted before reaching upstream channel banks such as channel banks 102 and 104, fairness assurance procedures may also be built into this control system. For example, scheduler 200 and/or processor 178 in each controller may be programmed to limit the rate at which any particular queue or group of queues may dequeue cells upstream.

Another method for ensuring fairness is to implement a queue class system in which queues in the upstream channel banks such as channel banks 102 and 104 may be designated separately from the downstream channel bank queues, as previously described. Then, controller 140 in channel bank 106 may reserve a minimum number of cells specifically for the queues in the upstream channel banks.

While the invention has been particularly shown and described by the foregoing detailed description, it will be understood by those skilled in the art that various other changes in form and detail may be made without departing from the spirit and scope of the invention.

What is claimed is:

1. A distributed telecommunications switching system, comprising:
   a controller operable to generate and transmit a cell stream having a plurality of reserved cells each having a cell header which contains a marking indicating that the cell is reserved, the marking occurring in a position of the cell header which normally contains address information;
   a first customer premises equipment (CPE) unit operable to generate and transmit a first plurality of cells; and
   a first switching subsystem in communication with the first CPE unit and the controller, the first switching subsystem having a first receiving system, a second receiving, a first processor, and a first transmitting system, the first receiving system operable to receive the cell stream, the second receiving system operable to receive the first plurality of cells, the first processor operable to identify the reserved cells in the cell stream and to replace selected ones of the first plurality of cells to produce a modified cell stream, the first transmitting system operable to transmit the modified cell stream.

2. The distributed telecommunications switching system of claim 1, further comprising:
   a second CPE unit operable to generate and transmit a second plurality of cells; and
   a second switching subsystem in communication with the first switching subsystem and the second CPE unit, the second switching subsystem having a third receiving system, a fourth receiving system, a second processor, and a second transmitting system, the third receiving system operable to receive the modified cell stream, the fourth receiving system operable to receive the second plurality of cells, the second processor operable to identify remaining reserved cells in the modified cell stream and to replace selected ones of the remaining reserved cells with selected ones of the second plurality of cells to produce a remodified cell stream, the second transmitting system operable to transmit the remodified cell stream.

3. The distributed telecommunications switching system of claim 1, wherein the plurality of reserved cells comprises a first and second plurality of reserved cells, the first plurality of reserved cells being reserved for use by the first switching subsystem, the second plurality of reserved cells being reserved for use by the second switching subsystem, the first processor being operable to identify the first plurality of reserved cells in the cell stream and to replace selected ones of the first plurality of reserved cells with the selected ones of the first plurality of cells to produce the modified cell stream, the second processor being operable to identify the second plurality of reserved cells in the modified cell stream and to replace selected ones of the second plurality of reserved cells with the selected ones of the second plurality of cells to produce the remodified cell stream.

4. The distributed telecommunications switching system of claim 1, wherein the first switching subsystem further comprises a scheduler in communication with the first transmitting system, the scheduler being operable to trigger transmission of the modified cell stream by the first transmitting system.

5. The distributed telecommunications switching system of claim 1, wherein the cell stream further comprises a plurality of non-reserved cells.

6. A distributed telecommunications switching system, comprising:
   a controller operable to generate in transmit a cell stream having a plurality of cells reserved for a first queue class and a plurality of cells reserved for a second queue class, wherein each cell in the pluralities of cells reserved for the first and second queue classes has a cell header which contains a marking indicating that the cell is reserved for either the first queue class or the second queue class, respectively, the marking occurring in a position of the cell header which normally contains address information;
   a first subscriber interface system operable to transmit the first plurality of return cells;
   a second subscriber interface system operable to transmit a second plurality of return cells; and
   a first switching system in communication with the first and second subscriber interface system and the controller, the first switching system having a first receiving system, a second receiving system, and dequeuing system, the first receiving system operable to receive the cell stream, the second receiving system operable to receive the first and second plurality of return cells, the dequeuing system operable to identify the cells reserved for the first queue class in the cell stream and to replace selected ones of the cells reserved for the first queue class with selected ones of the first plurality of returns cells, the dequeuing system being operable to identify the cells reserved for the second queue class in the cell stream and to replace selected ones of the cells reserved for the second queue class with selected ones of the second plurality of return cells, the dequeuing system being operable to generate and transmit a modified cell stream.

7. The distributed telecommunications switching system of claim 6, wherein the dequeuing system of the first switching system comprises:
   a processor operable to receive and inspect the cell stream;
   a bypass queue operable to receive and retransmit selected portions of the cell stream; and
   a first ingress queue operable to receive and retransmit the selected ones of the first plurality of return cells.

8. The distributed telecommunications switching system of claim 7, wherein the dequeuing system further comprises a second ingress queue operable to receive and retransmit the selected ones of the second plurality of return cells.

9. The distributed telecommunications switching system of claim 7, wherein the dequeuing system further comprises a scheduler operable to trigger the retransmission of the selected ones of the first plurality of return cells by the first ingress queue.

10. The distributed telecommunications switching system of claim 6, wherein the second receiving system of the first switching system comprises:

a first buffer operable to receive, store and retransmit to the dequeuing system the first plurality of return cells; and a second buffer operable to receive, store and retransmit to the dequeuing system the second plurality of return cells.

11. A method for transmitting data in a telecommunications network, comprising the steps of:

generating at a controller a cell stream having a plurality of reserved cells each having a cell header which contains a marking indicating that the cell is reserved, the marking occurring in a position of the cell header which normally contains address information;

receiving at a first switching system the cell stream;

receiving at the first switching system a first plurality of subscriber cells;

replacing selected ones of the reserved cells in the cell stream with selected ones of the first plurality of subscriber cells at the first switching system to produce a modified cell stream; and transmitting the modified cell stream to a second switching system;

wherein the step of receiving at the first switching system the first plurality of subscriber cells comprises the steps of:

receiving at an input buffer of the first switching system the first plurality of subscriber cells;

transmitting the first plurality of subscriber cells by the input buffer to a processor of the first switching system; and transmitting the first plurality of subscriber cells by the processor to an ingress queue of the first switching system.

12. The method of claim 11, wherein the step of replacing selected ones of the reserved cells in the cell stream with selected ones of the first plurality of subscriber cells at the first switching system comprises the step of dequeuing from the ingress queue the selected ones of the first plurality of subscriber cells.

13. The method of claim 11, further comprising the step of performing a validity check by the processor on an address portion of each one of the first plurality of subscriber cells.

14. A distributed telecommunications switching system, comprising:

a controller operable to generate and transmit a cell stream having a plurality of reserved cells each having a cell header which contains a marking indicating that the cell is reserved, the marking occurring in a position of the cell header which normally contains address information;

first customer premises equipment (CPE) unit operable to generate and transmit a first plurality of cells;

a first switching subsystem in communication with the first CPE unit in the controller, the first switching subsystem having a first receiving system operable to receive the cell stream, a second receiving system operable to receive the first plurality of cells, a first processor operable to identify the reserve cells in the cell stream and to replace selected ones of the reserved cells with selected ones of the first plurality of cells to produce a modified cell stream, and a first transmitting system operable to transmit the modified cell stream;

a second CPE unit operable to generate and transmit a second plurality of cells; and a second switching subsystem in communication with the first switching subsystem and the second CPE unit, the second switching subsystem having a third receiving system operable to receive the modified cell stream, a fourth receiving system operable to receive the second plurality of cells, a second processor operable to identify remaining reserved cells in the modified cells stream and to replace selected ones of the remaining reserved cells with selected ones of the second plurality of cells to produce a remodified cells stream, a second transmitting system operable to transmit the remodified cell stream.

* * * * *